Nov. 2, 1937.                J. H. RITTER                2,097,645
                            SEA WATER FILTER
                           Filed Jan. 4, 1935
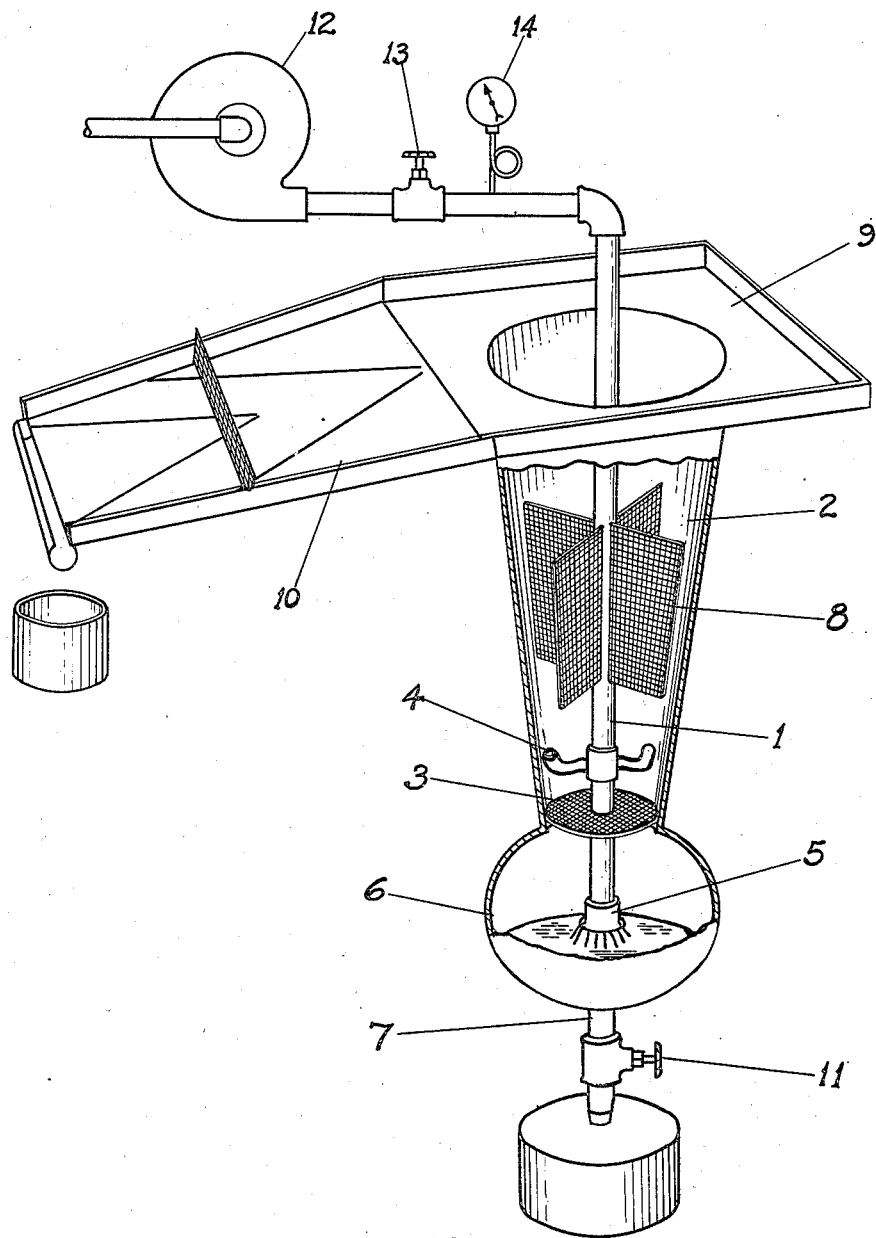
INVENTOR
BY  *John H. Ritter*
ATTORNEY Patented Nov. 2, 1937

2,097,645

UNITED STATES PATENT OFFICE 2,097,645

SEA WATER FILTER

John H. Ritter, Seattle, Wash.

Application January 4, 1935, Serial No. 373

3 Claims. (Cl. 209—183)

The object of my invention is to provide an improved construction of filter which will operate efficiently to filter gold, etc., from sea-water; and which will thoroughly commingle the gold, etc., with mercury and under such pressure that all of the gold, etc., will effect amalgamation with mercury. It is a further object of my invention to provide an improved filter in which the sea-water fed to the mercury bath and the minerals contained therein will form an amalgam, and the outflowing water is whirled against the screens to contact any floured mercury.

For a full description of the invention and the merits thereof, and also to acquire a knowledge of the details of construction of the means for effecting the result, reference is to be had to the following description, and accompanying drawing.

In the drawing the figure is a perspective view, with parts broken away and other parts shown in section, of an amalgamator constructed in accordance with my invention.

In the drawing and specification the same numbers refer to the same parts.

My improved filter comprises a casting, or suitable metallic structure, which may be made in one, two, or any convenient number of parts, according to the size of the apparatus; and it consists essentially of a central vertical feed-pipe, 1, located intermediate to the water discharge sluice column, 2, in which the feed pipe 1 opens at its lower end; said feed pipe 1 consists of a central vertical tube or pipe having at its lower extremity a spray nozzle, 5, terminating above the mercury surface, said mercury chamber, 6, having a draw-off port, or passage, 7. Preferably the sluice column, 2, tapers in a downward direction, and at its lower and smaller end is attached to mercury chamber, 6, having at a point near the bottom of the sluice column 2 one or any number of screens, 3, arranged to fit around the feed pipe 1 and against the wall of sluice column 2; these screens being for the purpose of contacting any floured mercury emanating from the mercury chamber, 6, caused by the churning water; also, two or more jet nozzles, 4, attached to feed pipe 1, open into sluice column 2, in opposite directions, at about 45 degrees elevation, to create whirling motion of the discharge water.

Further on, the feed pipe 1, owing to the downward deflection of said nozzle spray, 5, attached thereto, impels the water forcibly through the mercury, which is in the chamber 6, preferably to a height just below the nozzle jet 5; and the water will be caused to commingle with the mercury to form an amalgam from the gold, etc., contained in the sea-water. After the gold, etc., has been extracted from the sea-water, the water, by means of the pressure supplied, rises through screen 3 in sluice column 2, where it meets the whirling streams flowing out of jets 4, causing the water to be carried spirally upward, passing several times through screens 8, which are arranged in substantially vertical planes. These screens are for the purpose of contacting any of the floured mercury flowing out and, after accumulation, beads of mercury fall back through said screen 3, into the mercury chamber 6.

The discharge water continues upward over the top of plate 9, and further over the amalgamated plate 10, this metal plate being constructed of one piece of any desired length, preferably of copper, with the sides turned up at right angles the full length of plate to a necessary height, and having shallow sluices rolled therein at a slight angle the full length of plate, down to the trap, which is constructed in a funnel-shape with a downward slope to one side, so as to impel the gathered mercury into the trap, then out to a receptacle. Also, there is a screen, or any number of screens, attached to the plate 10, to gather any floured mercury which passes screen 8, and drop said mercury down to plate 10, to run into the sluices of this plate. Valve 11 is for drawing off the mercury. Pump 12 is for forcing water to feed pipe 1, under approximately 5 lbs. pressure, although wherever available would use the head from the tide and where not available would get necessary pressure from the pump. A tank or reservoir placed so as the tide comes in, which vary up to 12 feet or more, the pressure of the water stored up figures $2\frac{3}{10}$ feet head equals 1 lb. pressure per square inch. The water flow rates about 6 tons per hour using a 4 inch feed pipe at 5 lbs. pressure. Valve 13 is for regulating the pressure and gauge 14 is for determining water pressure in feed pipe 1.

From the foregoing description, in connection with the accompanying drawing, it will be seen that I have provided a filter, in which the sea-water will be thoroughly treated to effect a separation of the gold, and other minerals, therefrom.

Although I have herein described a preferred form of the invention, it will be understood that changes and modifications may be made in the construction without departing from the spirit and scope of the invention.

Having thus described the invention, what is claimed as new is:

1. In apparatus for recovering mineral values from water which contains such mineral values, a mercury receptacle; mercury in said receptacle; an upright tubular water overflow column connected with said mercury receptacle; a water feed pipe extending into said mercury receptacle; means supplying water which contains mineral values under pressure to said water feed pipe; a water spray nozzle on said water feed pipe positioned to deliver a spray of water which contains mineral values into the mercury in said mercury receptacle; nozzle jet means connected with said feed pipe and positioned to jet water into said tubular column in a generally tangential direction imparting a spiralling motion to the water flowing upwardly through said tubular column; and relatively fixed vertical screens provided in said tubular column above said nozzle jet means in the path of the spirally moving water, whereby floured mercury in said water will be collected by said screens as the water passes repeatedly through the screens.

2. In apparatus of the class described, a mercury receptacle; mercury in said mercury receptacle; a tubular column extending upwardly from said mercury receptacle; a horizontal overflow plate at the upper end portion of said column; an amalgamated plate connected with said overflow plate and inclined downwardly at a slight angle from the horizontal whereby water from said overflow plate will flow in a thin sheet over said amalgamated plate; a water feed pipe extending into said mercury receptacle; means supplying water which contains mineral values under pressure to said water feed pipe; a water spray nozzle on said water feed pipe positioned to deliver a spray of water which contains mineral values into the mercury in said mercury receptacle; and mercury collecting means positioned in the path of water which is discharging from said mercury receptacle collecting the floured mercury in said water, whereby loss of mercury is prevented.

3. In apparatus of the class described, a mercury receptacle; mercury in said mercury receptacle; a tubular column extending upwardly from said mercury receptacle; a horizontal overflow plate at the upper end of said column; an amalgamated plate connected with said overflow plate and inclined downwardly at a slight angle from the horizontal whereby water from said overflow plate will flow in a thin sheet over said amalgamated plate; screen means extending crosswise of said amalgamated plate in the path of the water flowing thereover; a water feed pipe extending downwardly through said tubular column into said mercury receptacle; pressure water supply means connected with said water feed pipe; a spray nozzle on the lower end of said water feed pipe positioned to deliver a spray of water into the mercury in said receptacle; transverse screen means in said tubular column in the path of the discharging water; nozzle jet means communicatively connected with said feed pipe and positioned within said tubular column and discharging water in generally tangential directions to impart a spiraling motion to the water discharging through said tubular column; and relatively fixed vertical screens in said tubular column above said nozzle jet means in the path of the spirally moving water in said column.

JOHN H. RITTER.